R. C. PIERCE.
METHOD OF MAKING COLLAR HEAD SCREWS OR THE LIKE.
APPLICATION FILED OCT. 14, 1916.

1,262,975.

Patented Apr. 16, 1918.

INVENTOR
Robert C. Pierce,
By Owen, Owen & Crampton,
His attys.

UNITED STATES PATENT OFFICE.

ROBERT C. PIERCE, OF CINCINNATI, OHIO, ASSIGNOR, BY MESNE ASSIGNMENTS, TO THOMSON ELECTRIC WELDING COMPANY, OF LYNN, MASSACHUSETTS, A CORPORATION OF MASSACHUSETTS.

METHOD OF MAKING COLLAR-HEAD SCREWS OR THE LIKE.

1,262,975.  Specification of Letters Patent.  Patented Apr. 16, 1918.

Application filed October 14, 1916. Serial No. 125,552.

*To all whom it may concern:*

Be it known that I, ROBERT C. PIERCE, a citizen of the United States, and a resident of Cincinnati, in the county of Hamilton and State of Ohio, have invented a certain new and useful Method of Making Collar-Head Screws or the like; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to the manufacture of screws, bolts or the like of the collar head type.

In the manufacture of articles of this character it has heretofore been the practice, so far as I am aware, to make the articles from stock of a diameter corresponding to the desired diameter of the collar and to then turn the metal down to form the head and particularly the shank of the screw, bolt or rod, as the case may be, thereby causing a great waste of material and labor incident to the removal of such waste or surplus material from the stock.

The primary object of my invention is the provision of a simple and improved method of making articles of the class described whereby a considerable saving of material, labor and expense in the manufacture of such articles is effected.

The invention is fully described in the following specification, and while, in its broader aspect, it is capable of being practised in numerous ways, a preferred manner of practising the same is illustrated in the accompanying drawings, in which—

Figure 1:
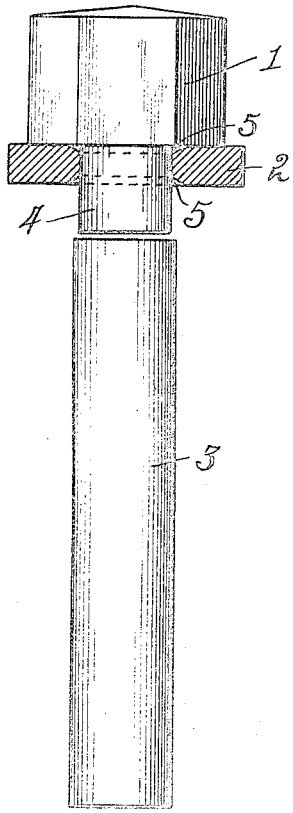
Figure 3:
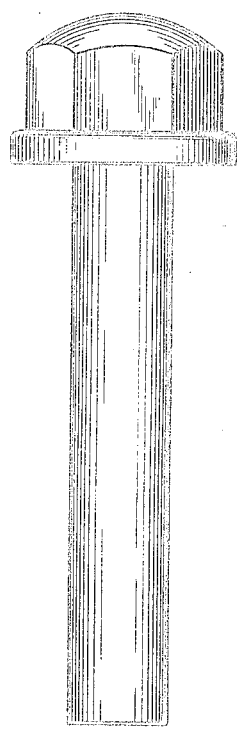
Figure 2:
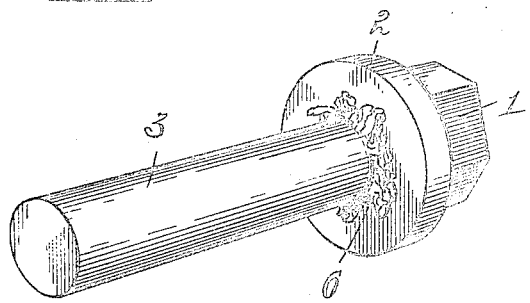

Figure 1 is a side elevation of the several parts of an article embodying the invention in assembled relation and with the collar in section. Fig. 2 is a perspective view of said parts as they appear after being welded together, and Fig. 3 is a side elevation of the finished article before the thread has been cut on the shank thereof.

In the practising of the invention three parts are employed, namely, the head 1, the collar 2, and the cylindrical bar 3 intended to form the body or shank portion of the screw, bolt or the like. The head 1, which may be round, square, octagonal, or other suitable shape, is provided at its inner end with an integral axial stud 4, which is circular in cross-section and of less diameter than that of the body part 3. The collar 2 has its opening of suitable size to fit snugly on the stud 4 and has the edges of its opening wall preferably cut away, as at 5.

When the parts 1, 2 and 3 have been assembled, as shown in Fig. 1, with the adjacent ends of the part 3 and head stud 4 in centered end abutment, an electric welding current is passed through the head 1 and body 3 to effect a heating and softening of the parts 3 and 4 at the point of contact. During the softening of the stock the parts 1 and 3 are forced together under a desired compressing stress, as is well understood in the welding art, thus causing an axial compressing and transverse spreading of the metal in the stud 4 to fill the spaces 5 in the collar and to permit the inner end of the body 3 to be forced adjacent to the collar thereby effectually welding the parts 3 and 4 together and rigidly securing the collar 2 to the head 1. The welding together of the body 3 and stud 4 in this manner forms a bur or ragged metal part 6 at the outer side of the collar, and this is subsequently removed by a milling or turning down operation or in any other suitable manner, as is well understood in the art. When the bur 6 has been removed the collar, head and shank have the appearance of a single integral member.

I wish it understood that my invention is not limited to the particular details shown and described, as it may be performed in numerous other ways without departing from the spirit of the claims.

Having thus described my invention, what I claim as new, and desire to secure by Letters Patent, is:—

1. The method of manufacturing collar screws, bolts or the like, consisting in providing a head part having a stud projecting therefrom, a shank part of greater cross-sectional area than said stud, and a collar fitted on said stud, and then rigidly uniting said parts and collar by welding an end of the shank part to the outer end of said stud and simultaneously applying an axial compressing stress thereto to upset said stud at the edge of the collar.

2. The method of manufacturing collar screws, bolts or the like, consisting in providing a head part having a stud projecting therefrom, a shank part of greater cross-sectional area than said stud, and a collar fitted on said stud and transversely reduced at its inner edge portion, then welding an end of the shank part to the outer end of said stud and applying an axial compressing stress thereto when heated to upset the metal around the inner edge of the collar.

3. The method of manufacturing collar screws, bolts or the like, consisting in providing a head part having a cylindrical stud axially projecting from one end thereof, a cylindrical shank of greater diameter than said stud, and a collar fitted on said stud and having the edges of its opening wall cut away, then electrically welding the shank part and stud together in centered end abutment and applying axial pressure thereto when heated to axially shorten and transversely expand said stud, the surplus material at the outer side of the collar then being removed.

4. The method of manufacturing collar head screws, bolts or the like consisting in providing a head part having a stud projecting therefrom, a collar fitted on said stud and being of less thickness than the length of said stud, and a shank part in end abutting relation to said stud with its abutting end portion of greater cross-sectional area than said stud and rigidly uniting said parts and collar by welding together the abutting ends of said stud and shank part and simultaneously applying an axial compressing stress thereto to upset said stud at the edge of the collar.

5. The method of manufacturing collar screws, bolts or the like consisting in providing a head part having a stud projecting therefrom, a collar fitted on said stud and being of less thickness than the length of said stud, and a shank part in end abutting relation to said stud with its abutting end portion of greater cross-sectional area than said stud and rigidly uniting said parts and collar by welding together the abutting ends of said stud and shank part and simultaneously applying an axial compressing stress thereto to upset said stud at the edge of the collar, and removing the bur formed at the outer side of the collar by the upsetting operation.

6. The method of manufacturing collar screws, bolts or the like, consisting in providing a head part having a stud projecting therefrom, a shank part of greater cross-sectional area than said stud, and a collar fitted on said stud, rigidly uniting said parts and collar by welding an end of the shank part to the outer end of said stud and simultaneously applying an axial compressing stress thereto to upset said stud at the edge of the collar, and removing the bur formed without the diameter of the shank part at the outer side of said collar.

7. The method of manufacturing collar screws, bolts or the like, consisting in providing a head part having a stud projecting therefrom, a shank part of greater cross-sectional area than said stud, and a collar fitted on said stud and transversely reduced at its inner edge portion, welding an end of the shank part to the outer end of said stud and applying an axial compressing stress thereto when heated to upset the metal around the inner edge of the collar, and removing the bur formed without the diameter of the shank part at the outer side of said collar.

In testimony whereof, I have hereunto signed my name to this specification.

ROBERT C. PIERCE.